J. E. GARRETT.
MACHINE FOR WORKING RUGS.
APPLICATION FILED APR. 29, 1920.

1,409,700.

Patented Mar. 14, 1922.
2 SHEETS—SHEET 1.

Inventor
John E. Garrett.
C. W. Anderson Son

By

Attorneys

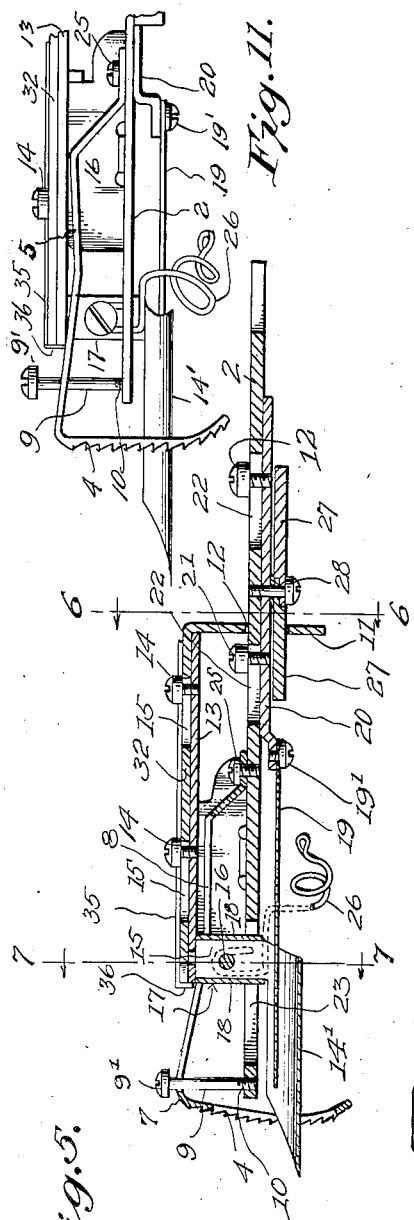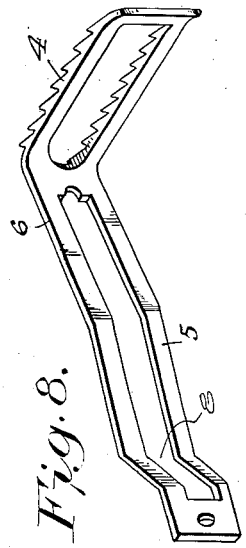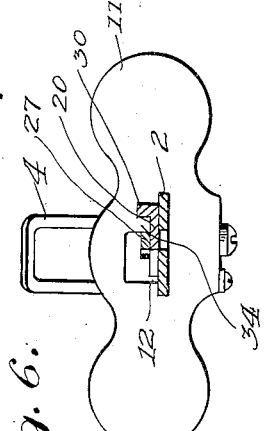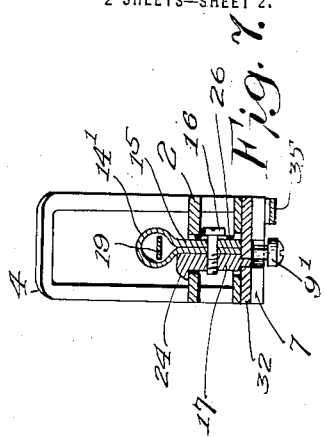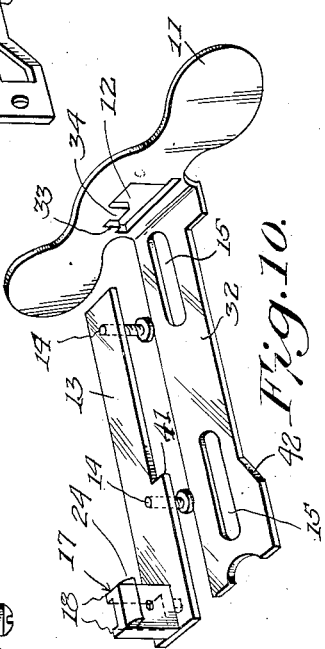

UNITED STATES PATENT OFFICE.

JOHN E. GARRETT, OF NEW GLASGOW, NOVA SCOTIA, CANADA.

MACHINE FOR WORKING RUGS.

1,409,700.   Specification of Letters Patent.   Patented Mar. 14, 1922.

Application filed April 29, 1920. Serial No. 377,527.

*To all whom it may concern:*

Be it known that I, JOHN E. GARRETT, a citizen of the Dominion of Canada, resident of New Glasgow, in the Province of Nova Scotia and Dominion of Canada, have made a certain new and useful Invention in Machine for Working Rugs; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 5 is a central longitudinal section, with the needle partly advanced.

Figure 6 is a section on the line 6—6 Figure 5.

Figure 7 is a section on the line 7—7, Figure 5.

Figure 8 is a detail perspective view of the presser foot.

Figure 9 is a similar view of the needle bar.

Figure 10 is a similar view of the winged handle.

Figure 11 is a fragmentary side view of the invention, with the bars in partly advanced position.

Figure 1:
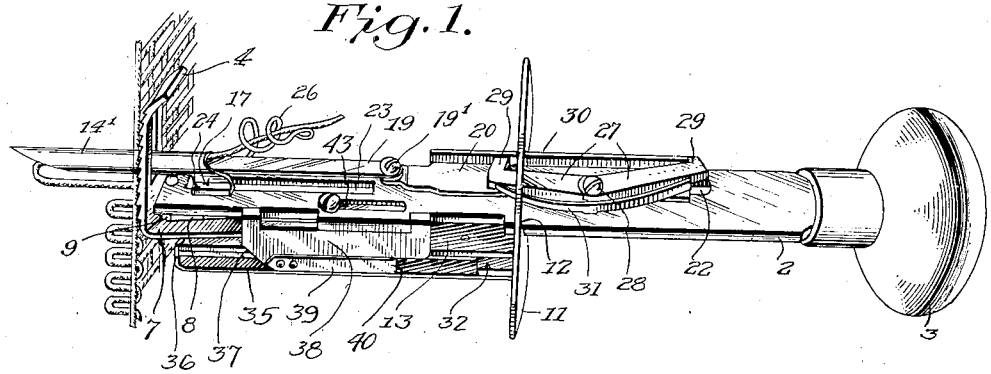
Figure 1 is a perspective view of the invention in extended position, with the needle and looper blade engaging the fabric base.
Figure 2:
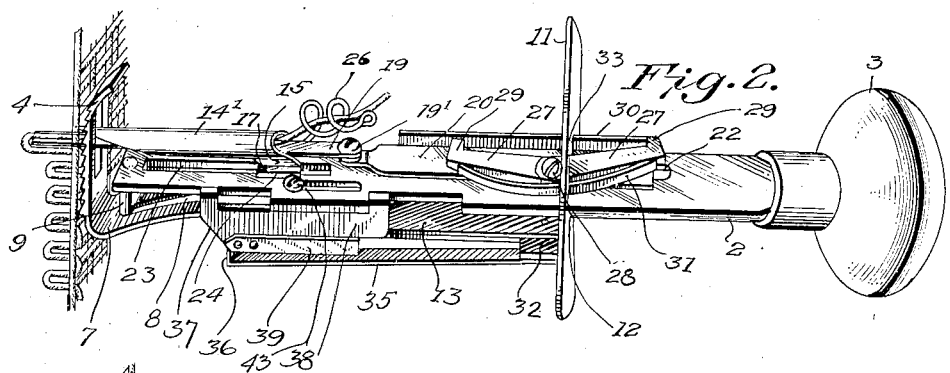
Figure 2 is a similar view, with the needle partly retracted.
Figure 3:
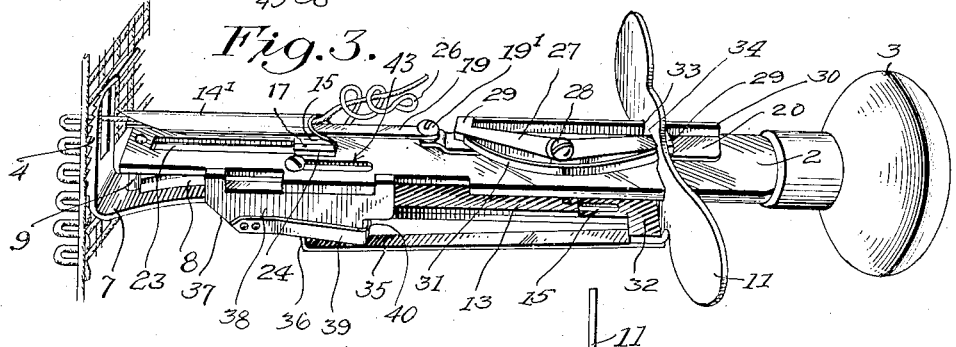
Figure 3 is a similar view with the needle and looper blade fully retracted.
Figure 4:
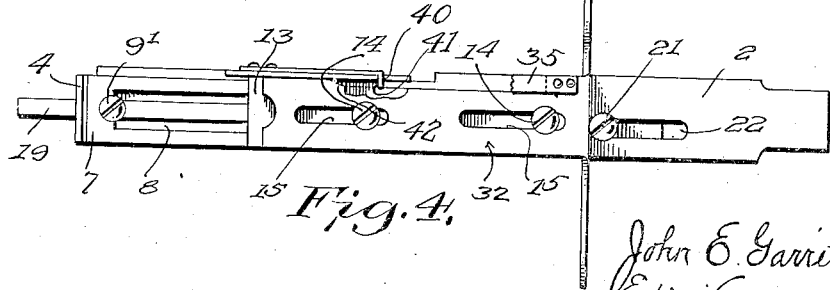
Figure 4 is a plan view of the invention, with the parts substantially in the position shown in Figure 2.

The invention has relation to machines for working rugs or mats known as hooked or drawn-in rugs, having a base of suitable fabric, such as burlap or Hessian. This base is of the desired size, being either plain or having a pattern to be worked in the rug, the edges being hemmed or bound and said fabric stretched tightly in a frame made for the purpose. The material for working the rug may be yarn, or cloth torn into strips of suitable width for the purpose, said material being worked through said fabric in the form of loops until the rug is finished, when none of the fabric remains visible.

In the use of the old fashioned rug hook, the worker draws the loops up through the fabric or base, toward the person, the loops in the present case, however, being pushed through the fabric, away from the person of the worker, the work being done much more quickly and more evenly.

The invention is designed as an improvement over the device of the U. S. Patent No. 889,922, dated June 9, 1908, of the present applicant, having for its object to provide means for adjusting the height of the loop or to make loops of different height, whereby the thickness of the rug may be varied; to provide means for varying the length of step by which the machine advances over the fabric or pattern, whereby the loops are made close together or farther apart, and to provide means admitting of the use of needles of two or more sizes, whereby material or yarn of different sizes may be employed in working the rug. Other objects and advantages will hereinafter appear.

The invention consists in the novel construction and combination of parts, as hereinafter set forth.

In the accompanying drawings, illustrating the invention, the numeral 2 designates the main frame of the machine, formed of flat or strap metal and provided at one end with a knob or handle 3.

Working longitudinally upon the main frame is the winged handle 11, the aperture 12 of which closely engages the marginal edges of the main frame, said handle being provided with a longitudinal extension 32, parallel to and offset from the main frame.

The needle bar 13 is connected with said extension by screws 14, engaging and working in slots 15 of the extension, and is provided with a lug 17, extending through a slot 23 of the main frame. The end walls of said slot 23 serve to limit the throw of needle bar 13. An upset end 24 of lug 17 cooperates with the head of screw 16, carried by said lug, to hold the free end of the needle bar in proper relation to said frame, this engagement, together with the engagement of the aperture 12 with the frame, serving to maintain the handle extension 32 and needle bar 13 in parallel relation to the frame, and to prevent twisting movement of the winged handle with relation thereto.

A presser foot 4 is located at the outer end of the main frame, being secured thereto at its inner end at 25. The presser foot is made of spring metal, and extends at its inner portion parallel to the main frame at 5; thence outwardly away from the main frame or inclined thereto at 6, and being at its free end portion angularly turned at 7, to provide the presser foot proper, which extends across the free end of the main frame, at about right-angles thereto. The longitudinally extending carrying portion or shank 5 and 6 of the presser foot is longitudinally slotted at 8, and the outer end of said slot is engaged by the head 9' of an adjusting screw 9, which has threaded engagement at 10 with the free end portion of the main frame. By adjustment of this screw the presser foot may be adjusted inwardly towards or allowed through its inherent resiliency to withdraw from the main frame, whereby the angle of inclination of the part 6 of the presser foot shank to the main frame may be varied.

The needle bar lies outside of and works close to the longitudinal stem or shank of the presser foot, and in the latter portion of its outward stroke engages with the cam or inclined portion 6 of said shank, thereby forcing the presser foot proper one step across the free end of the main frame, and across the fabric or pattern. Upon the backward stroke of the winged handle the presser foot, through inherent elasticity, will automatically resume its normal position, ready for the next step of advance; or more properly stated, the presser foot takes a bearing on the goods or rug and restores the machine to normal position relative to itself, in shifted position upon the rug. The adjustment of the screw 9 aforesaid establishes the initial degree of inclination of the cam portion of the longitudinal presser foot shank and the extent of projection of such cam portion beyond the plane of the needle bar, and regulates the length of step of the presser foot.

The tubular lance or needle 14' has at its rear end an inturned lug 15 whereby it is connected, by screw 16, with lug 17 of the needle bar. The needle is formed of sheet metal, bent into form, lug 15 being integral therewith and designed to engage closely a seat between parallel flanges 18 of the lug 17, so that it is held truly to proper position and prevented from any twisting movement under strain. Screw 16 also serves to secure a spring 26, provided with tension coils lying in rear of the needle and through which the yarn is fed to the aperture of the tubular needle.

The looper blade 19 engages the aperture or bore of the tubular needle, and at its rear end is connected by screw 19' with the looper bar 20, the latter having attachment screws 21 which work in longitudinal slots 22 of the main frame, the looper bar being thereby held close to the main frame, parallel to and against which it slides. The blade is moved in either direction through contact of the winged handle with the head of one or the other of the screws 21, and is held in either extreme position until this contact is effected by means of oppositely extending dogs 27, pivoted at 28 to the main frame and having hooked ends 29 designed to engage the end walls of an upturned edge 30 of the looper bar, the dogs being held against said edge by the action of spring 31. The aperture 12 of the winged handle has lateral extension at 33, to accommodate the looper bar and the dogs 27, and projecting into this aperture, between the edge 30 and the adjacent faces of the dogs, is a tooth 34 which, in the movement of the handle, acts to lift said dogs from latching engagement with the looper bar immediately before the engagement of the handle with the screws 21.

The parts being in normal position, the winged handle is moved outwardly, the first portion of its movement being taken up by movement of the screws 14 in the slots 15, the needle and needle bar being then moved outwardly, by contact of the handle with said screws, to pierce the goods or fabric base with the needle, the looper bar remaining in its initial position until the goods are so pierced and until the handle releases the looper latch and engages the head of the outer of the screws 21, when the needle and needle bar and the looper and looper bar will move together with said handle, the looper bar moving a distance equal to the length of the slots 22, or until the looper blade has followed the needle through the goods to an extent which is constant in all cases. In other words, the handle first moves alone, next the needle moves with the handle, and finally the looper moves with the handle and needle. During the initial movement of the needle slack is created in the yarn between the portion thereof held by the coils of spring 26 and the portion already looped into the fabric base, while during the final movement of the needle the looper blade extends this slack into a loop.

Upon reversal of the movement of the winged handle, the needle is first withdrawn therewith, owing to the action of a spring 35, carried by handle extension 32 and having a bent outer end 36, engaging the outer end of the needle bar. The reverse movement being continued, said bent end engages a cam surface 37 of a loop gauge 38, carried by the main frame, being thereby released from the needle bar, which will then become stationary during the second part of the return movement of the handle, being positively prevented from moving inwardly with the handle at this time by a spring 39 carried by the aforesaid loop gauge and having a bent inner end 40 engaging a shoulder 41 of the needle bar. Spring 39 is released from shoulder 41 at the end of this second part of the handle return movement by a cam surface 42 upon the handle extension 32 engaging said bent inner end of the spring, the outer walls of slots 15 then acting upon the screws 14 to complete the retraction of the needle bar.

The period of release of the needle bar from return movement with the handle is governed by the difference in extent of the interval between cam surface 37 and spring end 40 of the loop gauge and cam surface 42 and spring end 36 of the handle extension, and as said loop gauge is adjustable longitudinally of the main frame, by means of a screw and slot connection 43 therewith, said period may occur sooner or later in the return movement of the handle.

The looper remains in the fabric base until the winged handle has returned sufficiently to release the looper latch and engage the inner screw 21, the point of engagement with respect to this return movement being constant. Therefore, the needle will have been returned more or less to normal retracted position before the looper starts its return movement, according to the adjustment of the loop gauge 38.

During the third part of the return movement of the handle the needle and needle bar and the looper and looper bar move therewith. In case of extreme adjustment inwardly of the loop gauge 38 this third part of movement will be very short, or scarcely perceptible.

The loop of yarn will be held in the fabric base during the initial retractive movement of the needle by the stationary looper blade, the yarn pulling through spring 26 of the needle, while during the final movement of the needle, the looper blade being also retracted, the tension of spring 26 will act to pull out a given portion of said loop from the base. Therefore the height of the loops made in the goods or fabric base is governed by the adjustment of the loop gauge 38, whereby, as stated, the initial and final return movements of the needle, without and together with the looper blade, are varied in extent.

I claim:

1. In a machine for working rugs having fabric bases, a reciprocatory needle, reciprocatory means having an invariable length of stroke for looping yarn through said base by outward pushing action, and means for regulating the length of the loops.

2. In a machine for working rugs having fabric bases, a reciprocatory needle, reciprocatory means for pushing a loop of yarn outwardly through the base, means for withdrawing a portion of yarn from the loop, and means adjustable to determine the proportion of yarn to be withdrawn.

3. In a machine for working rugs having fabric bases, a reciprocatory needle, reciprocatory means for pushing a loop of yarn outwardly through the base, and spring means carried by said needle for withdrawing a portion of yarn from the loop.

4. In a machine for working rugs having fabric bases, a reciprocatory needle, a reciprocatory looper adapted to push a length of yarn outwardly through said base, and means for imparting an invariable outward movement and a variably timed relative inward movement to said needle and said looper.

5. In a machine for working rugs having fabric bases, a reciprocatory needle, a reciprocatory looper adapted to push a length of yarn outwardly through said base, a spring carried by said needle for tensioning the yarn, and means for imparting an invariable outward movement and a variably timed relative inward movement to said needle and said looper.

6. In a machine for working rugs having fabric bases, a reciprocatory needle, a reciprocatory looper adapted to push a length of yarn outwardly through said base, a spring carried by said needle for tensioning the yarn, and means for interrupting the movement of said needle at an intermediate point in the retractive stroke thereof.

7. In a machine for working rugs having fabric bases, a reciprocatory needle, a reciprocatory looper adapted to push a length of yarn outwardly through said base, a spring carried by said needle for tensioning the yarn, and means adjustable to interrupt the movement of said needle at a selected point in the retractive stroke thereof.

8. In a machine for working rugs having fabric bases, a reciprocatory needle, a looper having an invariable reciprocatory stroke and adapted to push a length of yarn outwardly through said base, reciprocatory means for operating said needle and said looper, and means for interrupting the movement of said needle at an intermediate point in the retractive stroke thereof.

9. In a machine for working rugs having fabric bases, a reciprocatory needle bar, a needle mounted thereon, a reciprocatory looper adapted to push a length of yarn outwardly through said base, and reciprocatory operating means having connection with said looper and a lost motion connection with said needle bar.

10. In a machine for working rugs having fabric bases, a reciprocatory needle bar, a needle mounted thereon, a reciprocatory looper adapted to push a length of yarn outwardly through said base, reciprocatory operating means having connection with said looper and a lost motion connection with said needle bar, means for latching said needle bar rigidly to said operating means during the outward stroke, and means for releasing the latch during the retractive stroke of the operating means.

11. In a machine for working rugs having fabric bases, a reciprocatory needle bar, a needle mounted thereon, a reciprocatory looper adapted to push a length of yarn outwardly through said base, reciprocatory operating means having connection with said looper and a lost motion connection with said needle bar, means for latching said needle bar rigidly to said operating means during the outward stroke, and adjustable means for releasing the latch at a selected point in the return stroke of the operating means.

12. In a machine for working rugs having fabric bases, a frame, a reciprocatory needle bar, a needle mounted thereon, a reciprocatory looper adapted to push a length of yarn outwardly through said base, reciprocatory operating means upon said frame having connection with said looper and a lost motion connection with said needle bar, spring means for latching said needle bar rigidly to said operating means during the outward stroke, and a cam member adjustable upon said frame to release the latch at a selected point in the return stroke of the operating means.

13. In a machine for working rugs having fabric bases, a frame, a reciprocatory needle bar, a needle mounted thereon, a reciprocatory looper adapted to push a length of yarn outwardly through said base, reciprocatory operating means upon said frame provided with a cam portion and having lost motion connection with said looper and with said needle bar, means for latching said needle bar rigidly to said operating means during the outward stroke, and a loop gauge adjustable upon said frame and comprising cam means for releasing the latch at a selected point in the return stroke of the operating means and spring means for preventing the retraction of the released needle bar, said preventing means releasable by the cam portion of said operating means.

14. In a machine for working rugs having fabric bases, a reciprocatory needle, a reciprocatory looper adapted for looping yarn through said base by outward pushing action, a reciprocatory presser foot adapted to advance the machine over said base, an operating member for said needle, said looper and said presser foot, and means adjustable to determine the degree of reciprocatory movement transmitted from said operating means to said presser foot.

15. In a machine for working rugs having fabric bases, a rigid frame member, a needle bar having right-line reciprocation upon said frame member, a needle mounted thereon, a looper bar having right-line reciprocation upon said frame member, a looper blade mounted thereon and adapted for looping yarn through said base by outward pushing action, and a presser foot adapted to regulate the distance between the loops.

16. In a machine for working rugs having fabric bases, a reciprocatory needle, a yarn-tensioning spring mounted upon said needle, a reciprocatory looper, and means for advancing said needle alone, to create slack in the yarn, and thereafter advancing said needle and said looper, to push said slack outwardly through the base.

17. In a machine for working rugs having fabric bases, a reciprocatory needle bar, a needle mounted thereon, a reciprocatory looper bar, a looper blade mounted thereon and adapted to push a length of yarn outwardly through said base, and a reciprocatory member having lost motion connection with said needle bar and with said looper bar and adapted for positive operation thereof throughout their reciprocatory movements.

18. In a machine for working rugs having fabric bases, a reciprocatory needle, a reciprocatory looper adapted to push a length of yarn outwardly through said base, means for reciprocating said needle and said looper singly and in unison, and means for holding said looper in each extreme position during a portion of the movement of said needle.

19. In a machine for working rugs having fabric bases, a reciprocatory needle, a reciprocatory looper adapted to push a length of yarn outwardly through said base, means for reciprocating said needle and said looper singly and in unison, and means for holding said looper in extreme retracted position during a portion of the movement of said needle.

20. In a machine for working rugs having fabric bases, a frame, a reciprocatory needle bar, a needle mounted thereon, a reciprocatory looper bar, a looper blade mounted thereon and adapted to push a length of yarn outwardly through said base, reciprocatory operating means upon said frame having lost motion connection with said needle bar and said looper bar, latch means mounted on said frame and adapted to engage said looper bar in one extreme position thereof, and means for releasing said latch before the lost motion of said operating means relative to said looper bar has been taken up.

In testimony whereof I affix my signature in the presence of two witnesses.

JOHN E. GARRETT.

Witnesses:
IRENE L. MARSHALL,
JOHN DOULL.